Oct. 8, 1929.  H. P. TAYLOR  1,731,115

LIMA BEAN CLEANER

Filed Dec. 15, 1928

Inventor
Henry P. Taylor
By Mason Fenwick & Lawrence
Attorneys

Patented Oct. 8, 1929

1,731,115

UNITED STATES PATENT OFFICE

HENRY PORTERFIELD TAYLOR, OF WALKERTON, VIRGINIA

LIMA-BEAN CLEANER

Application filed December 15, 1928. Serial No. 326,312.

This invention relates to improvements in food cleaners, especially of a type adapted for cleaning lima beans.

An object of this invention is to provide a screen adapted for the cleaning of lima beans and which may be used in connection with food cleaning machines now in common use, such as the eccentric driven shaking type of cleaner or washer, or cylindrical as in the rotary type of washer.

Another object of this invention is to provide a screen for cleaning lima beans, formed in such a manner that when the beans are broken during the shelling, and the skin of the bean slips away leaving irregular fragments of the two halves of the bean in a loose and free condition, the skin and fragments will drop through suitable openings in the screen, the screen at the same time functioning to efficiently separate the small and large whole beans from the fragments.

Another object of this invention is to provide a screen for cleaning lima beans formed in such a manner that the bean will be properly guided in its movement over the screen, so that the dirt, fragments and loose halves of the beans will be guided through the openings in the screen, the small and large whole beans being allowed to continue their movement along the guiding elements of the screen and deliver into suitable receptacles, thereby thoroughly separating the whole beans of various sizes from the waste matter.

Other objects of this invention will appear from the following detailed description of the device, and as disclosed in the single sheet of drawings which is herewith made a part of this application.

In the drawings—

In the cleaning of foods such as peas and beans, preliminary to canning, it has been found that in the case of lima beans during the shelling, some of the beans become broken, the skin slips away leaving irregular fragments of the two halves of the bean, and the problem has been to thoroughly separate the fragments and their undesirable elements from the whole beans, both of small and large commercial dimensions.

This invention provides a screen adapted for the purpose of cleaning foods such as peas and beans, and is especially adapted for the thorough cleaning and separation of lima beans.

Figure 1:
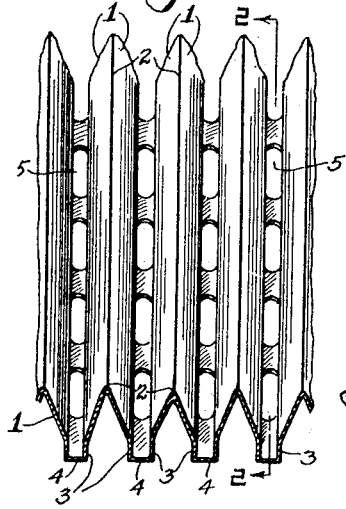
Figure 1 illustrates a perspective view of a portion of the screen for cleaning lima beans, disclosing the elongated slots therein and the form of the guiding members.
Figure 3:
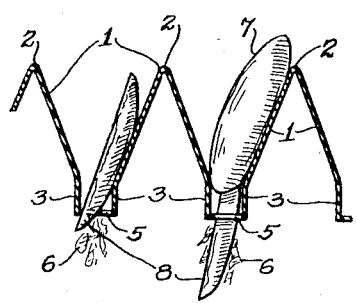
Figure 3 illustrates a sectional view of Figure 2 taken along line 3—3, disclosing a cross section of the screen and positions of fragments and halves of beans passing through the openings, while the whole bean is shown in the process of passing over the screen.

As one modification of this invention, it is preferred that a screen, made of any suitable material, such as sheet metal, be formed by stamping or otherwise, having guiding portions 1 arranged in trough-shaped formation, as clearly disclosed in Figures 1 and 3, wherein the guiding portions 1 are arranged in series, adjacent pairs forming a ridge or corrugations 2. The preferred general shape of the corrugations may be in the form of an isoscles triangle, the sides or guiding portions 1 being approximately one-half inch. the distance between the lower edges of the adjacent guiding portions 1 being slightly less in length than the sides 1. The base of the triangle, obviously, would be open in case the screen is made by pressing or stamping thin sheets of metal into the desired form. It is to be understood that the length of the sides and base of the triangle may be varied in order to provide proper adjustment to the various sizes of foods, such as beans and the like.

The A-shaped or isosceles triangular formed corrugations above described are preferred to be separated from each other by means of downwardly extending rectangular formed troughs, the sides 3 and bottom member 4 being approximately 9/64ths of an inch in width, it being understood, of course, that the measurements may be varied without affecting the merits of this invention.

Elongated openings 5, suitably spaced from each other, are formed in the bottom portions 4 of the screen, the width of the openings being approximately that of the downwardly extending trough, while the length of the openings will be sufficient for allowing the refuse matter such as the small pieces of skin 6, and other forms of undesirable matter to drop therethrough during the process of screening the beans 7, or other food.

The openings are formed also of a proper size for allowing fragments and half beans 8 to drop therethrough as well as other waste elements; the whole small and large beans only are permitted to continue their movement over the screen and be delivered into receiving receptacles preparatory to continuing the process of canning. The slots or openings 5 will obviously vary for the different sizes of beans, but will, as a general rule, approximate 9/64ths of an inch in width by 3/4ths of an inch in length. In this connection, it may be stated that a spray of water, in general practice, will play on the beans as they travel over the screen to assist in carrying off through the openings 5, the refuse matter including the half beans which may be separated from the sound and whole beans both large and small.

Figure 2:
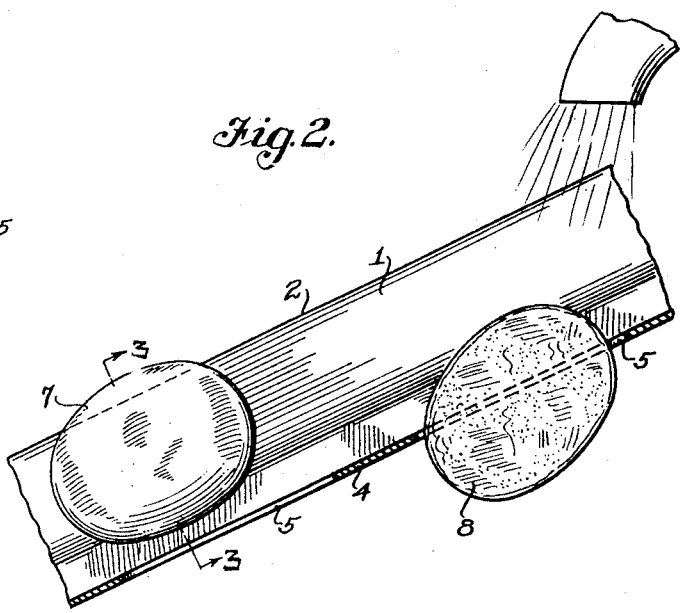
Figure 2 represents to an enlarged scale a sectional view of Figure 1 taken along line 2—2 showing a guiding portion of the screen, and elongated openings in the screen through which dirt, fragments, and halves of beans may be allowed to pass, the illustration disclosing the half of a bean passing through an opening, and a whole bean being allowed to pass thereover.

The A-shaped corrugations or ridges 2 in the case of flat screens are parallel to each other and extend in the direction of travel of the beans, the ridges or side portions 1 causing the edge of the lima bean to be presented to the slots 5, which occur between the A-shaped corrugations, as clearly disclosed in Figure 2, wherein a whole bean 7 is shown in its travel over the openings 5, while a fragment or half bean 8 is shown as dropping through an opening 5, the screen member in Figure 2 being illustrated at the approximate operative angle.

Figure 4:
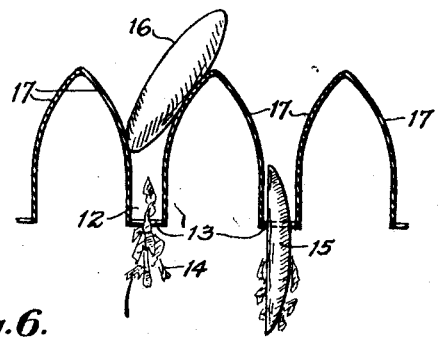
Figure 4 represents a modification of the form of screen according to this invention.

Figure 4 illustrates a modification of this invention and discloses a flat screen made from any proper material and provided with trough-shaped portions 12 and openings 13 similar to those described above for the purpose of allowing the refuse elements 14 and half bean members 15 to drop therethrough, while the whole beans 16 travel over the screen and deliver into the desired receptacle. The prime difference between the structure of the screens in Figures 3 and 4, is in the form of the corrugations, which in the case of Figure 4, are rounded upwardly and outwardly, as clearly disclosed at 17, thereby providing a guiding element for the bean 16, having the least possible frictional resistance and contact therewith.

Figures 5, 6:
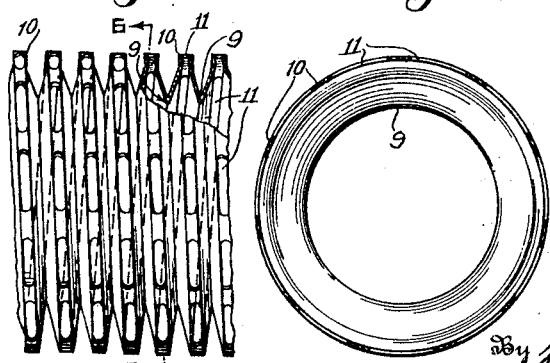
Figure 5 illustrates a side elevational view of a section of a modification of this invention disclosing the lima bean screen in cylindrical form, and a portion of the cylinder and guiding member being shown in section.
Figure 6 illustrates a sectional view of Figure 5 taken along line 6—6.

Figure 5 discloses a modification of this invention wherein the screen is of cylindrical formation and made of any suitable material, such as sheet metal pressed or stamped into the desired form. The corrugations may be of the general type described above for the flat screen, wherein numeral 9 designates the ridges or corrugations extending inwardly of the cylinder while the trough shaped portions 10 extend outwardly of the cylinder and are provided with suitable slots or openings 11, through which the refuse, fragments and half beans may be allowed to drop during the rotation of the cylinder, the beans or other food having been inserted within the cylinder for the purpose of cleaning.

The corrugations in the cylindrically shaped screen will be continuous and formed in a helical line, the trough-shaped portions 10 being also arranged in the same formation, thereby assisting greatly in allowing the passage of the beans through the cylinder from the feed end to the discharge end thereof.

In operation this invention provides a very efficient and practical means for cleaning foods, particularly of the type of lima beans. Practically all of the lima beans now canned commercially are shelled by machinery and during the shelling some of the beans become broken, the skins slip away and leave irregular fragments of the two halves of the bean. At a subsequent operation the beans are graded for size.

Unlike the approximately spherical English pea, the lima bean is flattened and generally oval in form, and instead of having one uniform diameter, it has three, such as length, breadth and thickness, the length being the greatest and the thickness the least. When the beans are graded through round holes now commonly used in food cleaners, the breadth is the critical factor, the length and thickness of the bean being negligible. The fragments of the two halves of the larger beans have a breadth which corresponds to the breadth of the small whole beans, which are the higher priced grades, and these fragments can not be separated from the small whole beans by means of screens having round holes without the loss of a great many of the small whole beans, due to increasing the diameter of the round holes in the screens used for cleaning beans.

One of the prime advantages in the construction of the lima bean cleaner, according to this invention, lies in the rectangular formed troughs bounded by side sections 3 and bottom portions 4. The trough is formed in such a manner that the whole bean in moving over the screen will not be allowed to contact with the rough and more or less sharp edges of the openings 5 in the bottom portion of the trough, hereby eliminating entirely any danger of being damaged from such a cause.

The construction of the screen above described is a great improvement over the eccentric driven, flat screens now in common use, which are usually subjected to an oscillatory motion having a frequency of about 160 oscillations per minute, and the edges of the whole beans in the case of the flat screen are brought into contact with the metal edges of the slots, thereby causing considerable injury to the bean. The trough construction above described does away entirely with this danger.

The fragments of the halves of beans do differ from the small whole beans, however, in their respective thickness, and differ so decidedly that this is a critical factor in effecting, if properly done, a complete or almost complete separation of the small whole beans from the fragments of the halves of larger beans. In the case of lima beans, and doubly so in the case of fragments of the halves, the length and breadth so much exceed that of thickness that the edge of the bean can not be presented readily to the slot in order to effect efficient separation, and therefore, the A-shaped ridges are provided to force the edge of the fragments into proper position for dropping through the slots or openings, a spray of water being used in common practice for aiding in forcing the fragments through the openings.

It will be understood that many changes and modifications may be made in the form of embodiment of this invention within the scope of the following claims without departing from the spirit of the invention.

What I claim is:

1. A food cleaning screen comprising a main body portion having parallel corrugations therein for guiding the food over the screen, the corrugations consisting of a plurality of downwardly and inwardly inclined side elements meeting along adjacent upper edges for forming a ridge, the lower edges of the side elements being extended at a steeper angle for connection with a bottom portion thereby forming a trough, elongated openings in the bottom portion through which refuse and waste fragments are allowed to drop after being guided thereto by the inclined side elements and trough.

2. A food cleaning screen comprising a main body portion having parallel corrugations therein for guiding the food over the screen, the corrugations consisting of a plurality of downwardly and inwardly inclined side elements meeting along adjacent upper edges for forming a ridge, the lower edges of the side elements being extended at a steeper angle for connection with a bottom portion thereby forming a trough, elongated openings in the bottom portion through which refuse and waste fragments are allowed to drop after being guided thereto by the inclined side elements and trough, the elongated openings being formed to eliminate all refuse, half portions of the food and the like, the whole food elements being allowed to deliver from the screen in uninjured condition.

In testimony whereof I affix my signature.

HENRY PORTERFIELD TAYLOR.